US006519231B1

(12) United States Patent
Ding et al.

(10) Patent No.: US 6,519,231 B1
(45) Date of Patent: Feb. 11, 2003

(54) METHOD AND APPARATUS PROVIDING A SPANNING TREE PROTOCOL FOR A DATA COMMUNICATIONS NETWORK HAVING A MULTI-LINK TRUNK

(75) Inventors: Da-Hai Ding, Lexington, MA (US); Nicholas Ilyadis, Pepperell, MA (US); Nelson Kong, Acton, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/229,116

(22) Filed: Jan. 12, 1999

(51) Int. Cl.[7] ........................ H04L 12/28; H04L 12/44
(52) U.S. Cl. .................. 370/256; 370/254; 370/255; 370/400; 709/220; 709/228
(58) Field of Search .................... 370/216, 238, 370/254–258, 386, 389, 392, 400–402, 403, 422, 423, 466, 467, 536; 709/220–222, 227, 228, 230, 238–244

(56) References Cited

U.S. PATENT DOCUMENTS

| | | | |
|---|---|---|---|
| 5,345,446 A | | 9/1994 | Hiller et al. |
| 5,452,297 A | | 9/1995 | Hiller et al. |
| 5,687,168 A | * | 11/1997 | Iwata .......................... 370/255 |
| 5,784,357 A | | 7/1998 | Wolker et al. |
| 5,949,788 A | | 9/1999 | Friedman et al. |
| 5,959,968 A | * | 9/1999 | Chin et al. ................... 370/216 |
| 6,016,310 A | | 1/2000 | Muller et al. |
| 6,032,194 A | * | 2/2000 | Gai et al. .................... 709/239 |
| 6,049,528 A | | 4/2000 | Hendel et al. |
| 6,151,297 A | | 11/2000 | Congdon et al. |
| 6,243,360 B1 | * | 6/2001 | Basilico ....................... 370/231 |
| 6,262,977 B1 | * | 7/2001 | Seaman et al. ............. 370/256 |
| 6,304,552 B1 | * | 10/2001 | Chapman et al. ........... 370/232 |

OTHER PUBLICATIONS

Radia Perlman, "Interconnections: Bridges and Routers," 1992, pp. 54–75, Addison Wesley Longman, Inc., USA.
International Standard ISO/IEC 10038, ANSI/IEEE Std 802.1D, 1993.
"Information Technology—Telecommunications and Information Exchange Between Systems—Local Area Networks—Media Access Control (MAC) Bridges", ANSI/IEEE Std. 802.1D, 1993 Edition.
Perlman, R.: "Spanning Tree Algorithm", Chapters 3.3–3.6.1, In Interconnections: Bridges and Routers pp. 54–75, Addison Wesley Longman, Inc., 1992.

* cited by examiner

Primary Examiner—Hassan Kizou
Assistant Examiner—Joe Logsdon
(74) Attorney, Agent, or Firm—Blakely Sokoloff Taylor & Zafman, LLP

(57) ABSTRACT

An enhanced spanning tree protocol for data communications networks having a multi-link trunk. In one embodiment, configuration messages are transmitted from boxes of the data communications network. In one embodiment, the configuration messages that are transmitted through all physical links of the same logical link, or multi-link trunk, include the same port Identifier. A network device that receives the configuration messages is therefore able to identify all of the physical links of a logical link. The enhanced spanning tree protocol according to one embodiment of the present invention considers all of the physical links of a multi-link trunk as a single logical link when identifying and removing loops in the data communications network to form a spanning tree.

27 Claims, 5 Drawing Sheets

METHOD AND APPARATUS PROVIDING A SPANNING TREE PROTOCOL FOR A DATA COMMUNICATIONS NETWORK HAVING A MULTI-LINK TRUNK

BACKGROUND OF THE INVENTION

1. Field of the Invention

The present invention relates generally to data communications networks and, more specifically, the present invention relates to multi-link trunk data communications networks using the spanning tree protocol.

2. Background Information

Data communications networks may be used to interconnect many computing resources, such as for example computers, workstations, servers, printers, modems, storage devices, etc. For example, two or more computers may be connected together through a network. Network users are able to, among other things, share files, printers and other resources, send messages and run applications on remote computers. An important part of any data communications network includes the physical components, boxes or network communications devices used to interconnect the computing resources.

FIG. 1 is an illustration of data communications network 101 including a box A 103, a box B 105 and a box C 107. Boxes A 103, B 105 and C 107 are network communication devices such as for example, bridges, switches, etc. As shown in FIG. 1, a physical link 109 is used to connect box A 103 to box B 105. Physical link 109 is coupled between port 1 of box A 103 and port 3 of box B 105. Physical link 111 is used to connect box B 105 to box C 107. Physical link 111 is coupled between port 4 of box B 105 and port 5 of box C 107. A physical link 113 is used to connect box A 103 to box C 107. Physical link 113 is coupled between port 2 of box A 103 and port 6 of box C 107.

During operation of data communications network 101, packets are broadcast and forwarded among boxes A 103, B 105 and C 107 through the physical links 109,111 and 113. For example, box A 103 may transmit a packet to box B 105 through physical link 109. After box B 105 receives the broadcast packet from box A 103, box B 105 forwards the received packet through the other ports of box B 105. Therefore, box B 105 forwards the broadcast packet from port 4 through physical link 111 to box C 107. Similarly, after box C 107 receives the broadcast packet from box B 105, box C 107 forwards the received packet through the other ports of box C 107. Therefore, box C 107 forwards the broadcast packet from port 6 through physical link 113 back to box A 107.

Even though box A 103 originated the packet received from box C 107 through physical link 113, box A 103 will nevertheless reforward the received packet back out of port 1 through physical link 109 to box B 105. Consequently, broadcast packets that are forwarded throughout a network may be replicated and rebroadcast by each box and loop continuously throughout the network and cause an undesired avalanche.

To remedy this situation, the loop in data communications network 101 may be identified and removed to prevent broadcast packets from being continuously rebroadcast. For example, assume box A 103 is determined to be a root node and that boxes B and C 105 and 107 are leaf nodes in data communications network 101. Thus, the loop in data communications network may be removed by preventing packets from being forwarded between box B 105 and box C 107. As result, broadcast packets are no longer continuously rebroadcast throughout data communications network 101. One known protocol for identifying and removing loops in a data communications network is the spanning tree protocol as described in ANSI/IEEE Standard 802.1D.

Another important factor in data communications network is the bandwidth of the connections between the boxes of the network. Bandwidth is defined to be the amount of data that can be transmitted over a link in a given period of time. As the usage of a data communications network increases, the amount of traffic that is carried by the links between the boxes of the data communications network increases. If the bandwidth of the connections between the boxes of the network is not adequate to carry all of the network traffic, network performance is compromised.

One known method of increasing the bandwidth of connections between boxes in data communications networks is the utilization of a multi-link trunk. FIG. 2 provides an illustration of a data communications network 201 including a multi-link trunk 209 coupling a box A 203 to a box B 205. FIG. 2 also shows data communications network 201 including a box C 207 coupled to box A 203 through a physical link 215. Multi-link trunk 209 includes two physical links shown as physical link 211 and physical link 213. Together, physical links 211 and 213 form the single logical link of multi-link trunk 209.

The multi-link trunk 209 coupling together boxes A 203 and B 205 includes two physical links 211 and 213 in comparison to the single physical link 215 coupling together boxes A 203 and C 207. Assuming the bandwidth of physical links 211, 213 and 215 are all equal, the bandwidth of the multi-link trunk 209 connection between boxes A 203 and B 205 is twice that of the connection between boxes A 203 and C 207. Therefore, network performance of communications between box A 203 and box B 205 is improved with multi-link trunk 209.

A problem arises when using the spanning tree protocol to remove loops in data communications networks that utilize multi-link trunks. To illustrate, FIG. 3 shows a data communications network 301 that suffers from a loop condition. Data communications network 301 includes a multi-link trunk 309 that couples a box A 303 to a box B 305. Multi-link trunk 309 includes two physical links shown as physical link 311 and physical link 313. Together, physical links 311 and 313 form the single logical link of multi-link trunk 309. Data communications network 301 also includes a box C 307 coupled to box A 303 through a physical link 317. Box C 307 is also coupled to box B 305 through a physical link 315.

During operation of data communications network 301, box A 303 may transmit a packet to box B 305 through multi-link trunk 309. After box B 305 receives the broadcast packet from box A 303, box B 305 forwards the received packet through other ports of box B 305. Therefore, box B 305 forwards the broadcast packet from port 6 through physical link 315 to box C 307. Similarly, after box C 307 receives the broadcast packet from box B 305, box C 307 forwards the received packet through other ports of box C 307. Thus, box C 307 forwards the broadcast packet from port 8 through physical link 317 back to box A 303, which is where the packet originated. Therefore, there is a loop condition in data communications network 301.

As discussed earlier, the known spanning tree protocol may be used to identify and remove loops in data communications networks. Assuming that box A 303 is determined to be a root node, the spanning tree protocol would remove the loop by preventing packets from being forwarded across physical link 315 between box B 305 and box C 307. However, the known spanning tree protocol would also detect a loop condition existing between box A 303 and box B 305 because of the multiple physical links of multi-link trunk 309. In particular, physical links 311 and 313 form a loop between box A 303 and box B 305. Consequently, the known spanning tree protocol would prevent packets from being forwarded across either physical link 311 or physical link 313, thereby transforming the high bandwidth connection of multi-link trunk 309 into an ordinary single physical link.

SUMMARY OF THE INVENTION

A method and an apparatus for interconnecting a plurality of boxes in data communications network is disclosed. In one embodiment, the first and second ports of a first box are coupled to first and second ports of a second box, respectively, to form first and second physical links between the first and second boxes. The first and second physical links form a logical link between the first and second boxes. The port identifier of the first port of the first box is included in a first configuration message that is transmitted from each one of the first and second ports of the first box to the first and second ports of the second box, respectively. Since the first and second ports of the second box both receive the first configuration message, which includes the port identifier of the first port of the first box, the first and second physical links and between the first and second boxes are considered as a single logical link in the network. Finally, a loop in the data communications network is blocked. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus providing an enhanced spanning tree protocol for use in data communications networks having multi-link trunks. In the following description, numerous specific details are set forth in order to provide a thorough understanding of the present invention. It will be apparent, however, to one having ordinary skill the art that the specific detail need not be employed to practice the present invention. In other instances, well-known materials or methods have not been described in detail in order to avoid obscuring the present invention.

In one embodiment, the present invention provides an enhanced spanning tree protocol that is compatible with data communications networks having multi-link trunks. In one embodiment, compatibility between the spanning tree protocol and the data communications network having multi-link trunks is achieved by having the spanning tree protocol consider the multi-link as a single logical link. As a result, in one embodiment, the spanning tree protocol does not block any individual physical path of a multi-link trunk without blocking all of the physical paths of the multi-link trunk.

In one embodiment, the present invention also provides the ability to detect and compensate for misconfigured connections of multi-link trunks between boxes in a data communications network. One embodiment of the present invention detects a port that is connected to an incorrect port, which in effect results in more than one logical link between the boxes that are connected by the multi-link trunk. One embodiment of the present invention handles this misconfiguration condition and automatically forwards packets through only one of the logical links between the two boxes connected by the multi-link trunk. In one embodiment, when this misconfiguration problem is corrected and the port is properly connected to the correct port, for example by a user connecting the cable to the correct port, packets are then automatically reforwarded through the all the physical links of the multi-link trunk.

Figure 1:
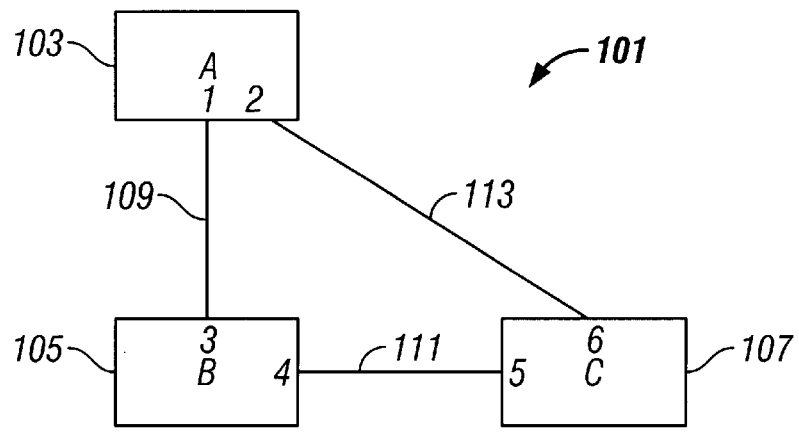
FIG. 1 is a block diagram illustrating a data communications network suffering from a loop condition.
Figure 2:
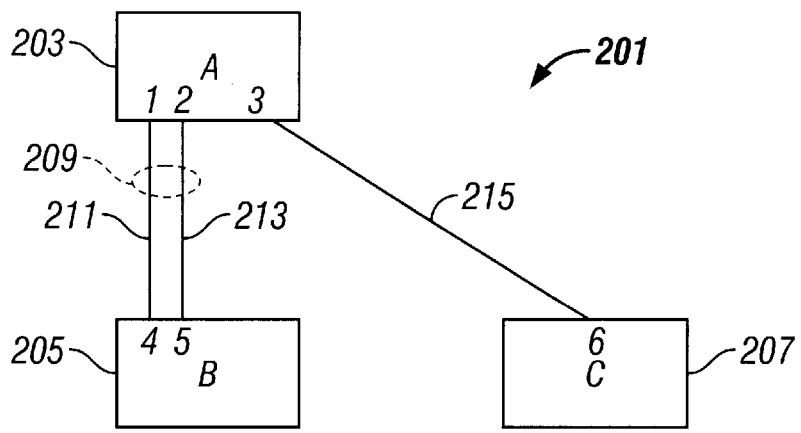
FIG. 2 is a block diagram illustrating a data communications network including a multi-link trunk.
Figure 3:
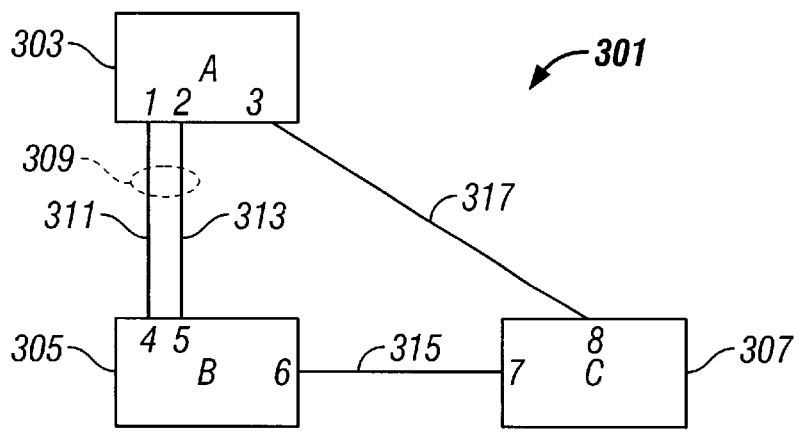
FIG. 3 is a block diagram illustrating a data communications network having a multi-link trunk and suffering from a loop condition.
Figure 4:
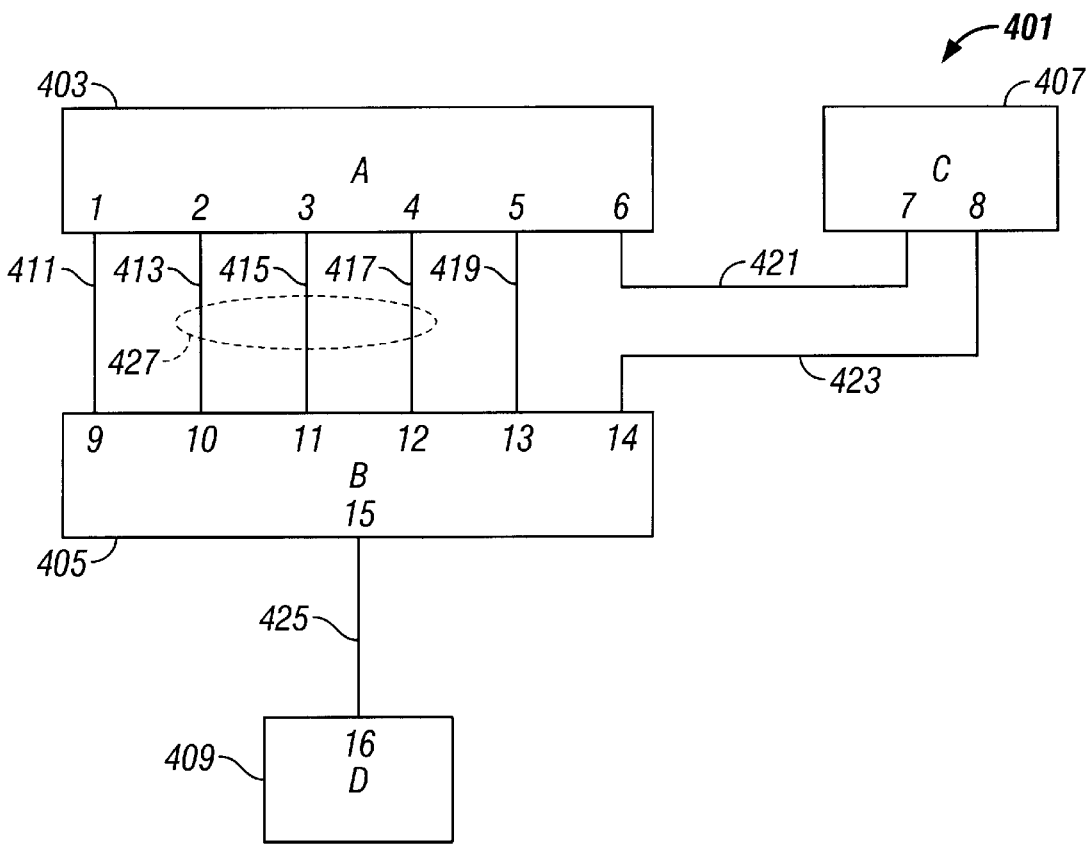
FIG. 4 is a block diagram illustrating one embodiment of a data communications network having a multi-link trunk and suffering from a loop condition in accordance with the teachings of the present invention.

FIG. 4 is of a block diagram illustrating one embodiment of a data communications network 401 in accordance with the teachings of the present invention. It is appreciated of course that data communications network 401 is provided for illustration purposes and is therefore merely an example of a data communications network topology in accordance With the teachings of the present invention. Thus, other data communications network topologies may be implemented in accordance with the teachings of the present invention.

As shown in FIG. 4, one embodiment of data communications network 401 includes a box A 403 coupled to a box B 405 and a box C 407. Box B 405 is also coupled to a box D 409. In one embodiment, boxes A 403, B 405, C 407 and D 409 may be network communications devices such as for example but not limited to bridges, routers, etc. In one embodiment, boxes A 403, B 405, C 407 and D 409 are devices capable of Layer 2 functionality as described by the known Open System Interconnection (OSI) Reference Model. Box A 403 is coupled to box B 405 through physical links 411, 413, 415, 417 and 419. Box A 403 is coupled to box C 407 through physical link 421. Box B 405 is coupled to box C 407 through physical link 423. Box B 405 is also coupled to box D 409 through physical link 425.

As depicted in the embodiment illustrated in FIG. 4, physical link 411 is coupled between port 1 of box A 403 and port 9 of box B 405. Physical link 413 is coupled between port 2 of box A 403 and port 10 of box B 405. Physical link 415 is coupled between port 3 of box A 403 and port 11 of box B 405. Physical link 417 is coupled between port 4 of box A 405 and port 12 of box B 405. Physical link 419 is coupled between port 5 of box A 403 and port 13 of box B 405. Physical link 421 is coupled between port 6 of box A 403 and port 7 of box C 407. Physical link 423 is coupled between port 14 of box B 405 and port 7 of box C 407. Physical link 425 is coupled between port 15 of box B 405 and port 16 of box C 409.

In one embodiment a multi-link trunk includes at least two or more physical links. In the embodiment depicted in FIG. 4, physical links 413, 415 and 417 are the individual physical links of a multi-link trunk 427. Thus, multi-link trunk 427 is considered to be a single logical link in accordance with the teachings of one embodiment of the present invention. As a result, multi-link trunk 427 provides an increased bandwidth connection between box A 403 and box B 405. Assuming all physical links 411, 413, 415 and 417 have the same bandwidth, multi-link trunk 427 has three times the bandwidth of physical link 411 in the embodiment depicted in FIG. 4.

In one embodiment, boxes A 403, B 405, C 407 and D 409 utilize a spanning tree protocol to identify and remove loops in data indications network 401. In one embodiment, a protocol that is compatible with the known spanning tree protocol according to ANSI/IEEE Standard 802.1D is utilized by the present invention. Information describing ANSI/IEEE Standard 802.1D may be found in "Information Technology—Telecommunications and Information Exchange between Systems-Local Area Networks—Media Access Control (MAC) Bridges," International Standard ISO/IEC 10038:1993, ANSI/IEEE Standard 802.1D, 1993 Edition, which is incorporated herein by reference. By using the spanning tree protocol, each box A 403, B 405, C 407 and D 409 is able to learn a spanning tree of the network, which is a subset of the topology of data communications network 401 that is free of loops and has adequate connectivity such that there is a single logical path between every box A 403, B 405, C 407 and D 409 in data communications network 401.

In one embodiment, every box A 403, B 405, C 407 and D 409 transmits a special configuration message in accordance with the teachings of the present invention across each physical link to neighboring boxes. The transmitted configuration messages enable each box to calculate a spanning tree of data communications network 401. In one embodiment, the configuration message is transmitted by boxes A 403, B 405, C 407 and D 409 is compatible with the known configuration bridge protocol data units (BPDUs) defined in IEEE Standard 802.1D. In one embodiment, each configuration message provides information such that each box A 403, B 405, C 407 and D 409 is able to, among other things, select a single box among all the boxes in data communications network 401 to be the "root" box, choose a port that gives a preferred path from the box to the "root" box, determine a path cost of each link to the "root" box, and select ports to be included and not to be included in the spanning tree. In one embodiment, all of the above tasks are realized using a protocol that is compatible with the spanning tree protocol as defined in IEEE Standard 802.1D.

Figure 5:
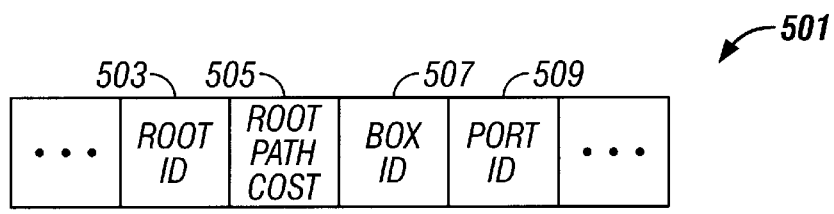
FIG. 5 is a diagram illustrating one embodiment of a configuration message that is transferred between boxes of data communications network in accordance with teachings of the present invention.

FIG. 5 provides an example of one embodiment of a configuration message 501 in accordance with the teachings of the present invention. As shown in FIG. 5, one embodiment of configuration message 501 includes at least a root ID field 503, a root path cost field 505, a box ID field 507 and a port ID field 509. Root ID field 503 provides the identification of the box in data communications network 401 that is assumed to be the "root" box. Root path cost field 505 provides the cost of the known least cost path to the "root" box from the transmitting box. As will be discussed in greater detail below, in one embodiment, the information provided in root path cost field 505 will be based upon the total combined bandwidth of each physical link of each corresponding multi-link trunk, or individual logical link. Finally, the port ID field 509 provides the identification of the box transmitting the particular configuration message.

In one embodiment, the procedure used by each box A 403, B 405, C 407 and D 409 to identify the "root" box is compatible with the spanning tree protocol as defined in IEEE Standard 802.1D. For example, during operation, each box initially assumes itself to be the "root" box and transmits configuration messages on each of its ports with its own identifier provided in the root ID field 503 with the root path cost of zero. Each box in data communications network 401 continuously receives configuration messages on each of its ports. Each box remembers the "best" configuration message from each port, which is determined by comparing the configuration messages received from a particular port as well as the configuration messages that the box transmits from the particular port.

In one embodiment, the "best" configuration message is determined in general using the following criteria: 1) the configuration message having the lower root ID is the "better" configuration message; 2) if the root ID values are equal, then the configuration message having the lower root path cost and is the "better" configuration message; 3) if the root ID values and the root path cost values are equal, then the configuration message having the lower box ID value is the "better" configuration message; and 4) if the root ID values, the root path cost values and the box ID values are equal, then the configuration message having the lower port ID value is the "better" configuration message.

To illustrate, assume in FIG. 4 that each box A 403, B 405, C 407 and D 409 transmits the configuration messages 501 as described above. Assume further that box A 403 has a lower root ID than box B 405, which has a lower root ID than box C 407, which has a lower root ID than box D 409. As a result, since box A 403 has the lowest root ID, box A 403 will eventually be determined to be the "root" box of data communications network 401 by boxes A 403, B 405, C 407 and D 409 after configurations messages have been transmitted in accordance with the teachings of one embodiment of the present invention.

As mentioned earlier, the configuration message transmitted from each port contains the port identifier of each port that is transmitting that particular configuration message. For example, referring to FIG. 4, the configuration message transmitted from port 1 of box A 403 contains a "1" in the port ID field 509. The configuration message transmitted from a port 9 of box B 405 contains a "9" in the port ID field 509.

In one embodiment of the present invention, the port ID field 509 of the configuration messages transmitted over each physical link of a multi-link trunk contains the same port identifier. In one embodiment, the port identifier included in the port ID field of the configuration messages transmitted over each physical link of a multi-link trunk is the lowest port identifier of the set of ports included in the multi-link trunk.

To illustrate, data communications network 401 includes a multi-link trunk 427 coupled between box A 403 and box B 405. Multi-link trunk 427 includes physical links 413, 415 and 417. Thus, in one embodiment, all of the configuration messages transmitted from box A 403 to box B 405 across physical links 413, 415 and 417 contain a "2" in the port ID field 509. That is, each configuration message transmitted from port 2 across physical link 413 to port 10 contains a "2" in port ID field 509. In addition, each configuration message transmitted from port 3 across physical link 415 to port 11 and each configuration message transmitted from port 4 across physical link 417 to port 12 also contain a "2" in port ID field 509. Similarly, all of the configuration messages transmitted from box B 405 to box A 403 across physical links 413, 415 and 417 contain a "10" in the port ID field 509. Thus, each configuration message transmitted from port 10 across physical link 413 to port 2 contains a "10" in port ID field 509. In addition, each configuration message transmitted from port 11 across physical link 415 and transmitted from port 12 across physical link 417 to ports 3 and 4, respectively, also contain a "10" in port ID field 509.

In one embodiment, since the configuration messages transmitted across physical links 413, 415 and 417 contain the same port identifier, the. spanning tree protocol considers all of these physical links to be a single logical link, or a single multi-link trunk. As will be discussed in greater detail below, in the event that the spanning tree protocol determines that a particular link between boxes is to be set in a blocking state or a forwarding state, all physical links of a particular logical link will either be set together in blocking state or forwarding state. That is, no individual physical link 413, 415 and 417 of a multi-link trunk 427 will be set in blocking state while another individual physical link of that particular multi-link trunk is set in forwarding state in accordance with the teachings of one embodiment of the present invention.

It is worthwhile to note that since physical links 413, 415 and 417 are considered as a single logical link in multi-link trunk 427, a single packet that is broadcast across multi-link trunk 427 is only transmitted across one of the physical links 413, 415 and 417. Stated differently, the single packet that is broadcasted across multi-link trunk 427 does not need to be separately transmitted across each physical link 413, 415 and 417. For example, referring to FIG. 4, if a single packet is broadcast from port 16 across physical link 425 to port 15, that packet would be forwarded across only one of the physical links 413, 415 and 417 if multi-link trunk 427 is set in forwarding state. Furthermore, if a single packet has been broadcast across one of the physical links 413, 415 and 417, that particular packet does not need to be broadcast back through multi-link trunk 427 in the opposite direction through any one of the remaining physical links of multi-link trunk 427. For example, referring to FIG. 4, if a single packet is broadcast across physical link 413 from port 2 port 10, that packet is not rebroadcast across multi-link trunk 427 from either port 11 or 12 back to port 3 or 4, respectively.

As mentioned earlier, one embodiment of the configuration message transmitted from each port also contains the root path cost of the known least cost path to the "root" box from the transmitting box. In one embodiment, this root path cost field 505 value is based at least in part upon the bandwidth of the particular link (physical or logical). In one embodiment, if a particular link is a multi-link trunk, and therefore includes a plurality of physical links, the value provided in the root path cost field 505 is based upon the bandwidth of all of the physical links of the multi-link trunk combined.

Figure 6:
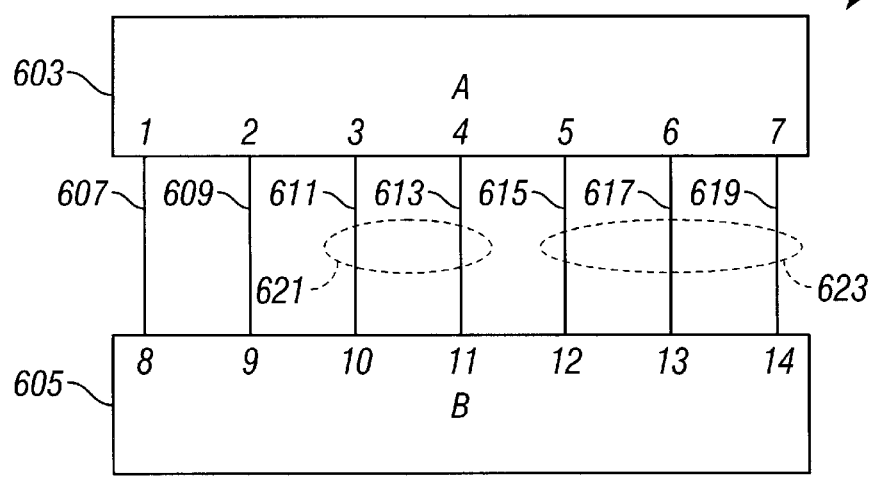
FIG. 6 is a block diagram illustrating one embodiment of two boxes in a data communications network having a plurality of individual physical links and multi-link trunks with varying path costs in accordance with the teachings of the present invention.

To illustrate, FIG. 6 is an illustration of the data communications network 601 including a box A 603 coupled to a box B 605 through physical links 607, 609, 611, 613, 615, 617 and 619. Physical link 607 is coupled between port 1 of the box A 603 and port 8 of box B 605. Physical link 609 is coupled between port 2 of box A 603 and port 9 of box B 605. Physical link 611 is coupled between port 3 of box A 603 and port 10 of box B 605. Physical link 61 3 is coupled between port 4 of box A 603 and port 11 of box B 605. Physical link 615 is coupled between port 5 of box A 603 and port 12 of box B 605. Physical link 617 is coupled between port 6 of box A 603 and port 13 of box B 605. Physical link 619 is coupled between port 7 of box A 603 and port 14 of box B 605.

In one embodiment, a link having a bandwidth of 10 Mbps is assumed to have a path cost of 100. A link having a bandwidth of 100 Mbps is assumed to have a path cost of 10. A link having a bandwidth of 1 Gbps is assumed to have a path cost of 1. Note that in this embodiment, the greater the bandwidth of the link, the lower the cost of the link. As will be discussed in greater detail below, the spanning tree protocol in accordance with the teachings of the present invention chooses a lower cost path over a higher cost path when determining the spanning tree for a data communications network. It is appreciated that the specific path cost value assignments discussed in this embodiment are provided for illustration purposes only and that other cost values may be assigned in accordance with the teachings of the present invention.

Referring back to FIG. 6, assume that physical link 607 has a bandwidth of 100 Mbps and that physical links 609, 611, 613, 615, 617 and 619 all have a bandwidth of 1 Gbps. Thus, in this example, a route including physical link 607 would add a cost of 10 to the path cost to the "root" box. In comparison, a route including physical link 609 would add a cost of 1 to the path cost to the "root" box. Therefore, physical link 609 would provide a lower cost path between boxes A 603 and B 605 than physical link 607.

Continuing with the example shown in FIG. 6, assume that a first multi-link trunk 621 includes physical links 611 and 613 and second multi-link trunk 623 includes physical links 615, 617 and 619. In one embodiment, the path cost of a multi-link trunk is of 1/(the total bandwidth of the multi-link trunk). Assuming that physical links 61 1, 613, 615, 617 and 619 all have a bandwidth of 1 Gbps, multi-link trunk 621 would add a cost of 1/(1+1) or ½ to the path cost to the "root" box and multi-link trunk 623 would add a cost of 1/(1+1+1) or ⅓ to the path cost to the "root" box. Since the root path costs of multi-link trunks 621 and 623 are based on the bandwidths of the respective physical links combined, multi-link trunk 623 would provide a lower cost path between boxes A 603 and B 605 than multi-link trunk 621.

As discussed earlier, one embodiment of the present invention utilizes the spanning tree protocol to identify and remove loops in a data communications network. In one embodiment, the spanning tree protocol used to identify and removed the loops is described in ANSI/IEEE 802.1D. In so doing, certain links in the data communications network are set to be in blocking state instead of forwarding state such that the resulting spanning tree of the data conditions network is free of loops and has adequate connectivity such that there is a single logical path between every box in the data conditions network.

Referring back to the example illustrated in FIG. 4, assume that all physical links 411, 413, 415, 417, 419, 421, 423 and 425 all have the same bandwidth of 1 Gbps. As a result, physical link 411 and physical link 419 each add a cost of 1 to a path to the "root" box. In comparison, multi-link trunk 427 adds a lower cost of ⅓ to a path to the "root" box. Note that in one embodiment, multi-link trunk 427 adds a path cost having a fractional or non-integer value. Thus, the spanning tree protocol selects multi-link trunk 427 to be in forwarding state and sets physical links 411 and 419 in blocking state to remove the loops between box A 403 and box B 405. Note that the spanning tree protocol considers multi-link trunk 427 as a single logical link in accordance with the teachings of the present invention, even though multi-link trunk 427 includes a plurality of physical links 413, 415 and 417. Assuming box A 403 is determined to be the "root" box, the spanning tree protocol in one embodiment also sets physical link 423 in blocking state to remove a loop between boxes A 403, B 405 and C 407.

It is appreciated that boxes A 403, B 405 and C 407 may also be coupled to other boxes (not shown) in data communications network 401. In one embodiment, the other boxes of data communications network 401 utilize the known ANSI/IEEE 802.1D standard, but do not use the improved spanning tree protocol of the present invention. It is appreciated that the standard known ANSI/IEEE 802.1D protocal does not the support fractional path costs of one embodiment of the present invention. Rather, the standard known ANSI/IEEE 802.1D protocol only supports integer path costs. Thus in one embodiment, the fractional path cost of multi-link trunk 427 is therefore expressed as an integer value of 1 instead of the fractional value of ⅓ in the configuration messages that are transferred among the boxes in data communications network 401. Stated differently, in one embodiment the fractional path costs are considered internally as non-integer values within the boxes of the present invention, but the fractional path costs are expressed as integer values when externally communicated among the boxes through the network.

Therefore, the present invention provides in one embodiment an enhanced spanning tree protocol that identifies and removes loops in data communications networks having multi-link trunks. The enhanced spanning tree protocol described herein removes the loops in the data communications networks without blocking individual physical links of multi-link trunks that would otherwise be set in a forwarding state. Furthermore, one embodiment of the present invention is compatible with other boxes in the network that utilize the known spanning tree protocol as defined in ANSI/IEEE 802.1D and therefore do not recognize fractional or non-integer path costs.

Figure 7A:
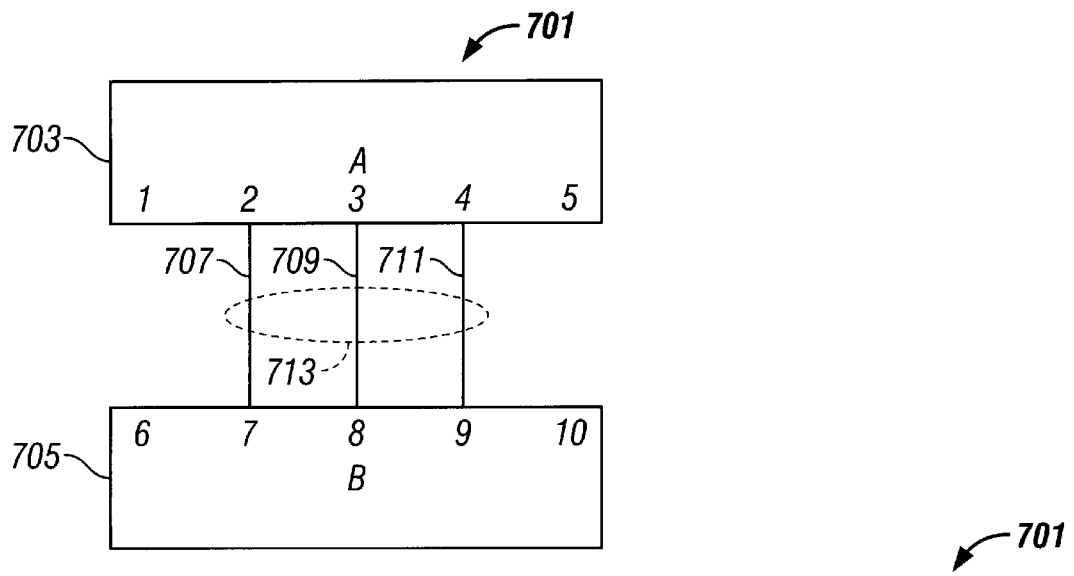
FIG. 7A is a block diagram illustrating one embodiment of two boxes in a data communications network having a multi-link trunk with physical links that are properly connected in accordance with the teachings of the present invention.

In one embodiment of the present invention, boxes of the data communications network have the ability to detect misconfigured multi-link trunks. To illustrate, FIG. 7A depicts a portion of the data communications network 701 including a box A 703 coupled to the box B 705 through a multi-link trunk 713. As shown in the embodiment illustrated in FIG. 7A, multi-link trunk 713 includes physical links 707, 709 and 711. Physical link 707 is coupled between port 2 of box A 703 and port 7 of box B 705. Physical link 709 is coupled between port 3 of box A 703 and port 8 of box B 705. Physical link 711 is coupled between port 4 of box A 703 and port 9 of box B 705.

In the embodiment illustrated in FIG. 7A, multi-link trunk 713 is properly configured. Thus, the configuration messages transmitted from box A 703 across physical links 707, 709 and 711 to box B 705 all contain the same port ID value in the port ID field 509. For example, in one embodiment, the port ID value contained in port ID field 509 of a configuration message transmitted from box A 703 to box B 705 across multi-link trunk 713 is "2." Thus, during normal operation of multi-link trunk 713, ports 7, 8 and 9 of box B 705 are configured to expect to receive configuration messages containing a port ID value of "2." Similarly, during normal operation, ports 2, 3 and 4 of box A 703 are also configured to expect to receive configuration messages containing a port ID value of "7" in accordance with the teachings of one embodiment of the present invention.

Figure 7B:
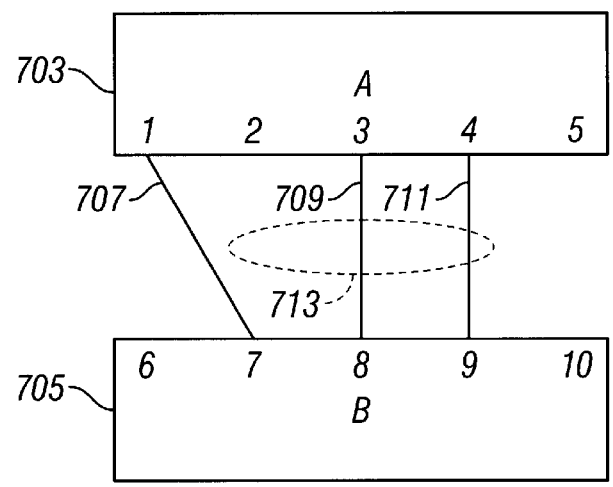
FIG. 7B is a block diagram illustrating one embodiment of two boxes in a data communications network having a multi-link trunk with physical links that are not properly connected in accordance with the teachings of the present invention.

FIG. 7B illustrates data communications 701 having a misconfiguration condition in multi-link trunk 713. In particular, physical link 707 is improperly connected to port 1 instead of port 2 of box A 703. Consequently, since port 1 is not configured to be a part of multi-link trunk 713 as illustrated in FIG. 7A, port 7 of box B 705 receives a configuration message including an incorrect port ID value of "1" instead of the expected port ID value of "2." As a result, box B 705 will have detected a misconfiguration condition in multi-link trunk 713 because port 7 is not properly connected to a port on box A 703 transmitting a configuration message having a port ID value of "2."

To compensate for this misconfiguration condition, box B 705 in one embodiment will automatically set the logical link of the port having the lowest port ID to forwarding state and the logical links of the ports not having the lowest port ID to blocking state. In the embodiment illustrated in FIG. 7B, box B 705 will automatically set ports 8 and 9 into a blocking state in accordance with the spanning tree protocol to remove the loop condition, while port 7 is set in a forwarding state. The reason is that without a dedicated multi-link trunk protocol to indicate the trunk configuration on box A 703, box B 705 uses the lowest numbered port ID seen on its own trunk links as the designated trunk ID for box A 703.

In one embodiment, box B 705 includes a status monitor (not shown) that indicates the status of the ports of box B 705 using known techniques. The status monitor will indicate that ports 8 and 9 are set to be in blocking state instead of the expected forwarding state. Thus, a network administrator will be able to detect that there is a misconfiguration because ports 8 and 9 are a blocking state instead of the expected forwarding state.

In one embodiment, the network administrator can correct this situation and physically disconnect port 7 of box B 705 from port 1 of box A 703 and properly reconnect port 7 to port 2 of box A 703. In one embodiment, after physical link 707 has been properly reconnected to port 2, port 7 will begin receiving configuration messages including the port ID value of "2." At this time, since of "2" is the expected port ID value to be received in the configuration message, box B 705 will automatically reset ports 8 and 9 from blocking state back into forwarding state because physical link 707 is now properly coupled.

Figure 7C:
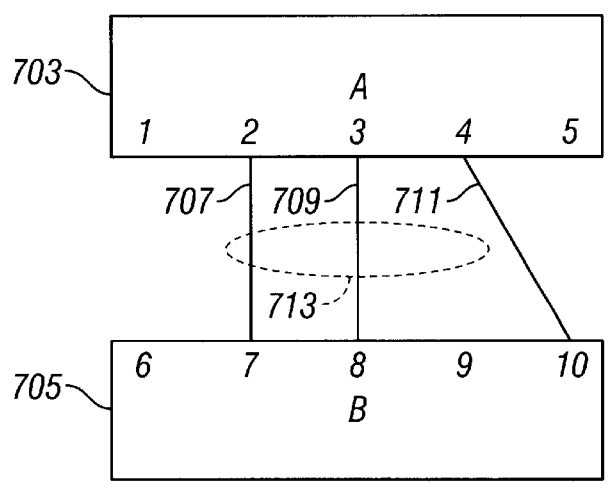
FIG. 7C is a block diagram illustrating another embodiment of two boxes in a data communications network having a multi-link trunk with physical links that are not properly connected in accordance with the teachings of the present invention.

FIG. 7C illustrates another embodiment of data communications network 701 having a misconfiguration condition multi-link trunk 713. It is appreciated that in one embodiment the configuration messages that are passed between boxes A 703 and B 705 are utilized for the root discovery process of the spanning tree protocol. In the embodiment detected and FIG. 7C, physical link 711 is improperly connected to port 10 instead of port 9 of box B 705. Consequently, since port 10 is not configured to be a part of multi-link trunk 713 as illustrated in FIG. 7A, port 4 of box A 703 receives a configuration message including an incorrect port ID value of "10" instead of the expected port ID value of "7." As a result, box A 703 will have detected a misconfiguration condition in multi-link trunk 713 because port 4 is not properly connected to a port on box B 705 transmitting a configuration message having a port ID value of "7."

To remedy this misconfiguration condition, box A 703 in one embodiment of the present invention will automatically set port 4 into a blocking state in accordance with the spanning tree protocol to remove the loop condition. In one embodiment, box A 703 includes a status monitor (not shown) that indicates the status of the ports of box A 703 using known techniques. The status monitor will indicate that port 4 is set to be in blocking state instead of the expected forwarding state. Thus, a network administrator will be able to detect that port 4 is misconfigured because it is in blocking state instead of forwarding state.

In one embodiment, the network administrator can correct this situation and physically disconnect port 4 of box A 703 from port 10 of box B 705 and properly reconnect port 4 to port 9 of box B 705. In one embodiment, after physical link 711 has been properly reconnected to port 9, port 4 will begin receiving configuration messages including the port ID value of "7." At this time, since "7" is the expected port ID value to be received in the configuration message, box A 703 will automatically reset port 4 from blocking state back into forwarding state because physical link 711 is now properly coupled.

Thus, the enhanced spanning tree protocol according to one embodiment of the present invention the described enhanced spanning provides the ability to handle misconfigured multi-link trunks by detecting as well as blocking improperly connected links within a multi-link trunk. Another benefit of detecting and blocking improperly connected links within a multi-link trunk is that the traffic stream of a trunk can also be adjusted accordingly using known techniques.

Figure 8:
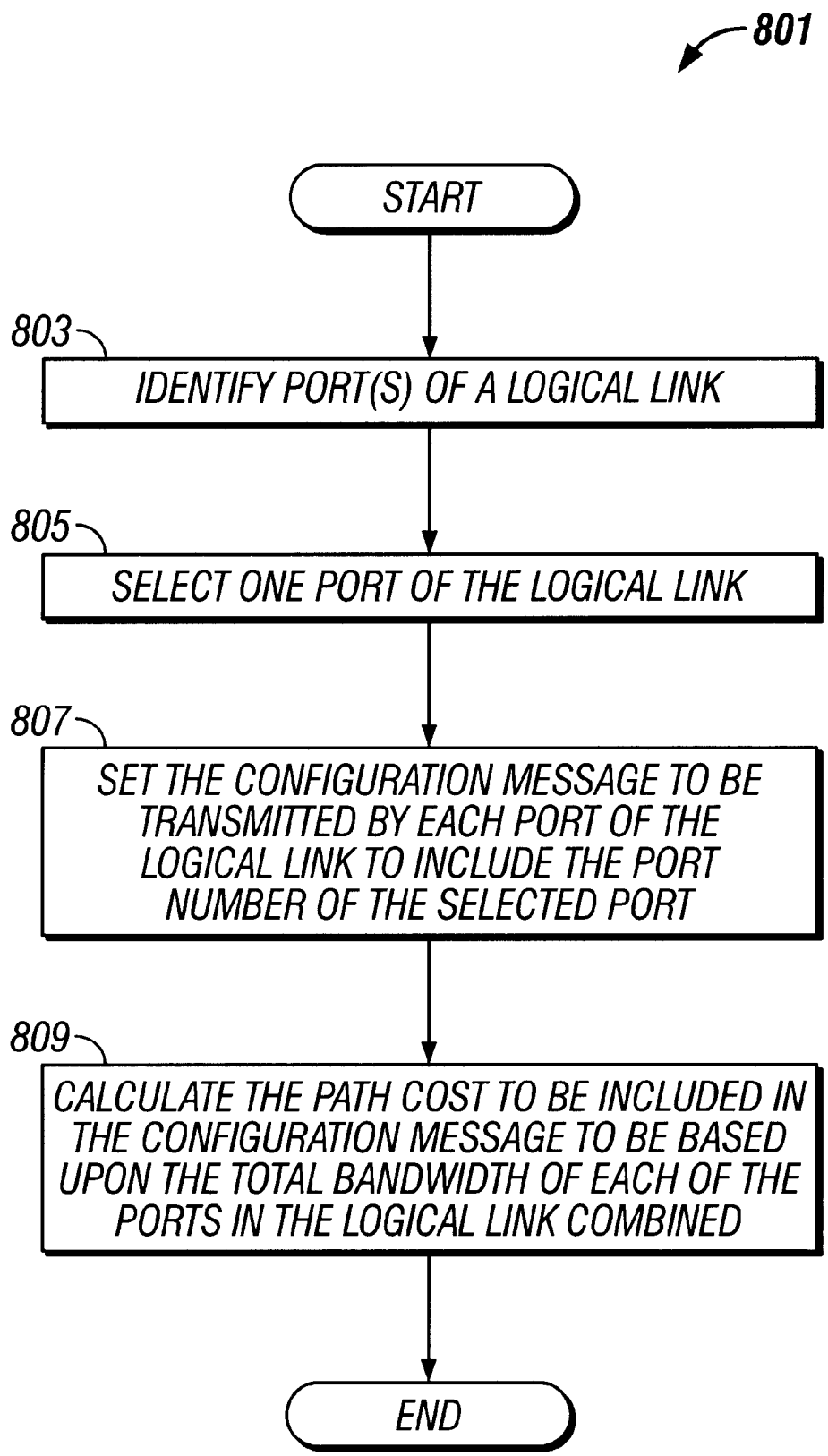
FIG. 8 is a flow diagram illustrating one embodiment of steps performed when generating a configuration message in accordance with the teachings of the present invention.

FIG. 8 is an illustration of a flow diagram 801 illustrating one embodiment of steps performed by a box in a communications network when generating a configuration message in accordance with the teachings of the present invention. For example, configuration message 501 of FIG. 5 may be generated in accordance with flow diagram 801.

As illustrated in processing step 803, the ports of a logical link are identified. For example, referring briefly back to FIG. 4 and assuming that a configuration message is being generated by box A 403 to be transmitted through physical link 411, the port of the logical link is port 1. However, assuming that a configuration message is being generated by box A 403 to be transmitted through multi-link trunk 427, the ports of the logical link are ports 2, 3 or 4.

Processing step 805 shows that one of the ports of the logical link is selected. If, for example, the configuration message is being generated by box A 403 to be transmitted through physical link 411, then the port that will be selected will be port 1. However, if the configuration message is being generated by box A 403 to be transmitted through multi-link trunk 427, the port that is selected may be one of ports 2, 3 or 4. In one embodiment, the port that is selected for a multi-link trunk is the port having the lowest numeric value. Thus, if the ports included in the logical link are 2, 3 or 4, then the port that is selected is port 2 in one embodiment.

Processing step 807 shows that the configuration message that is to be transmitted by each port of a logical link will include the port number of the selected port. Referring briefly back to FIG. 5, configuration message 501 will include a "1" in port ID field 509 if the configuration message is being generated by box A 403 to be transmitted through physical link 411. Thus, configuration message 501 having port ID field 509 containing a value of "1" will be transmitted from port 1. If, however, the configuration message is being generated to be transmitted through multi-link trunk 427 of FIG. 4, then configuration message 501 will include a "2" in port ID field 509 in the embodiment. This configuration message 501 having port ID field 509 containing a value of "2" will be transmitted by ports 2, 3 and 4 of the logical link.

Processing step 809 shows that path cost to be included in the configuration message is calculated based upon the total bandwidth of each of the ports in the logical link combined. For example, referring briefly back to FIG. 4 and assuming that the configuration message is being generated by box A 403 for physical link 411, the path cost will be based upon the bandwidth of physical link 411. In one embodiment, a link having a bandwidth of 1 Gbps is assigned a path cost value of 1. Therefore, assuming physical link 411 has a bandwidth of 1 Gbps, "1" will be added to the root path cost field 505. However, assuming that the configuration message is being generated by box A 403 for multi-link trunk 427, the path cost will be based upon the total bandwidth of physical links 413, 415 and 417 combined. Therefore, assuming physical links 413, 415 and 417 each have a bandwidth of 1 Gbps, $1/(1+1+1)$ or $\frac{1}{3}$ will be the path cost of multi-link trunk 427. In one embodiment, the fractional or non-integer value of $\frac{1}{3}$ is expressed as the integer value of 1 when transferred externally in root cost field 505 of configuration message 501. Thus, configuration message 501 is compatible with other boxes that utilize the standard known spanning tree protocol as described in ANSI/IEEE Standard 801.1D.

Figure 9:
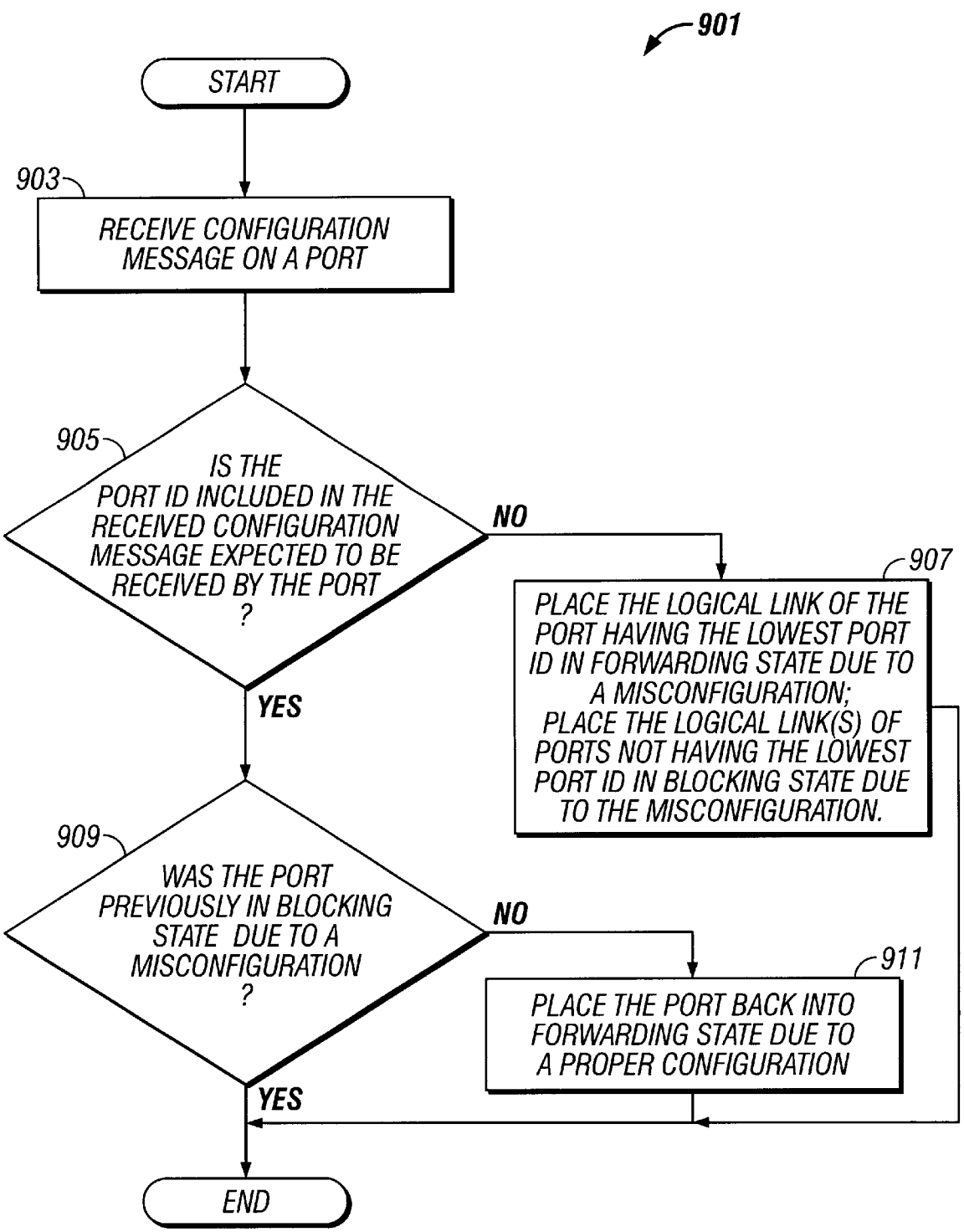
FIG. 9 is a flow diagram illustrating one embodiment of steps performed when handling misconfigurations in accordance with the teachings of one embodiment of the present invention.

FIG. 9 is an illustration of a flow diagram 901 illustrating one embodiment of steps performed by a box in a communications network in connection with misconfiguration handling in accordance with the teachings of the present invention. Processing step 903 shows that a configuration message is received on a port. For example, referring briefly back to FIG. 7A, a data communications network 701 is depicted having a multi-link trunk 713. Ports 7, 8 and 9 of box B 705 all expect to receive configuration messages having the same value in the port ID field 509, such as for example "2." Similarly, ports 2, 3 and 4 of box A 703 all expect to receive configuration messages having the same value in the port ID field 509, such as for example "7."

Decision step 905 shows that it is next determined whether the port ID included in the received configuration message is the port ID that is expected to be received by the port. For example, referring briefly back to FIG. 7B, port 7 of box B 705 expects to receive a configuration message having a port ID value of, for example, "2." If the configuration message received by port 7 of box B 705 contains a port ID value of, for example, "2," processing in flow diagram 901 proceeds to decision step 909. However, if the port ID included in the received configuration message is not the port ID that is expected to be received by the port, processing continues to processing step 907.

In the example illustrated in FIG. 7B, port 7 receives a configuration message having a port ID value of "1" instead of the expected value of, for example, "2." As a result, processing step 907 shows that in one embodiment, due to the misconfiguration condition, the logical link of the port having lowest port ID is placed in forwarding state and the logical link(s) of the port(s) not having the lowest port ID are placed in blocking state.

Assuming port 7 of FIG. 7B was earlier placed in a blocking state in processing step 707 and that a network administrator has corrected the misconfiguration problem by physically properly coupling physical link 707 between port 2 of box A 703 and port 7 of box B 705, box B 705 will then automatically place port 7 back into forwarding state in one embodiment due to the proper coupling. This aspect of one embodiment of the present invention is illustrated in decision step 909 and processing step 911.

Therefore, an enhanced spanning tree protocol for data communications network is provided. The described enhanced spanning tree protocol is compatible with data communications networks having multi-link trunks. The described enhanced spanning tree protocol properly determines path costs logical links having a plurality of physical links to determine which links to block to remove loops in accordance with the spanning tree protocol. Furthermore, the described enhanced spanning to protocol provides the ability to handle misconfigured multi-link trunks.

In the foregoing detailed description, the method and apparatus of the present invention has been described with reference to specific exemplary embodiments thereof. However, it will be evident that various modifications and changes may be made thereto without departing from the broader spirit and scope of the present invention. The present specification and figures are accordingly to be regarded as illustrative rather than restrictive.

What is claimed is:

1. A method of interconnecting a plurality of network devices in a data communications network including a first network device and a second network device, the method comprising the steps of:
    coupling first and second ports of the first network device to first and second ports of the second network device to form first and second physical links between the first and second network devices, the first and second physical links to form a logical link between the first and second network devices;
    including a port identifier of the first port of the first network device in a first configuration message;
    including a path cost of the logical link in the first configuration message such that the path cost is based upon a first bandwidth of the first physical link combined with a second bandwidth of the second physical link;
    transmitting the first configuration message from each one of the first and second ports of the first network device to the first and second ports of the second network device, respectively;
    considering the first and second physical links between the first and second network devices forming the logical link to be a single link in the network; and
    blocking any link in the network that forms a loop in the network.

2. The method of Interconnecting the plurality of network devices in the data communications network described in claim 1 wherein the blocking step is performed using a spanning tree protocol.

3. The method of interconnecting the plurality of network devices In the data communications network described in claim 1 including the additional steps of:
    configuring the first and second ports of the second network device to receive the first configuration message from the first and second ports of the first network device;
    receiving the first configuration message on the first port of the second network device;
    detecting a misconfiguration condition if the port identifier of the first port of the first network device is not included in the first configuration message received on the first port of the second network device;
    receiving the first configuration message on the second port of the second network device; and
    detecting the misconfiguration condition if the port identifier of the first port of the first network device is not included in the first configuration message received on the second port of the second network device.

4. The method of interconnecting the plurality of network devices in the data communications network described in claim 3 including the additional steps of:
    placing a logical link of a port of the second network device having a lowest port identifier in forwarding state if the misconfiguration condition is detected; and
    placing a logical link of a port of the second network device not having the lowest port identifier in blocking state if the misconfiguration condition is detected.

5. The method of interconnecting the plurality of network devices in the data communications network described in claim 1 including the additional step of determining a root network device of the first and second network devices in the data communications network.

6. The method of interconnecting the plurality of network devices in the data communications network described in claim 1 wherein the path cost is expressed as an integer value in the first configuration message.

7. The method of interconnecting the plurality of network devices in the data communications network described in claim 1 wherein the configuration message is a spanning tree protocol configuration bridge protocol data unit.

8. The method of interconnecting the plurality of network devices in the data communications network described in claim 1 wherein the port identifier of the first port of the first network device is a lower numbered port than a port identifier of the second port of the first network device.

9. A network device in a data communications network comprising:
    a plurality of ports including first and second ports coupled to first and second ports, respectively, of another network device in the data communications network to form first and second physical links,
    the network device to transmit a first configuration message over the first and second physical links from the network device to the other network device,
    the first configuration message to include
        a port identifier of the first port of the network device such that the first and second physical links are considered a single logical link of a multi-link trunk in the data communications network,
        a path cost of the logical link such that the path cost is based upon a first bandwidth of the first physical link combined with a second bandwidth of the second physical link,
    the network device to block a link in the data network to remove a loop in the data communications network.

10. The network device in the data communications network described in claim 9 wherein the path cost of the logical link is expressed as a non-integer value internal to the network device and as an integer value external to the network device.

11. The network device in the data communications network described in claim 9 wherein a spanning tree protocol is utilized to identify the loop in the data communications network.

12. The network device in the data communications network described in claim 9 wherein
the first and second ports of the network device are configured to receive a second configuration message over the first and second physical links,
the second configuration message to include a port identifier of the first port of the other network device,
the network device to detect a misconfiguration condition if the second configuration message received over the first physical link does not include the port identifier of the first port of the other network device,
the network device to detect the misconfiguration condition if the second configuration message received over the second physical link does not include the port identifier of the first port of the other network device.

13. The network device in the data communications network described in claim 12 wherein the network device is to place a logical link of a port of the network device having a lowest port identifier in forwarding state if the misconfiguration condition is detected, the network device to place a logical link of a port of the network device not having the lowest port identifier in blocking state if the misconfiguration condition is detected.

14. A data communications network, comprising:
a plurality of network devices including a first network device and a second network device; and
a multi-link trunk coupling the first network device to the second network device,
the multi-link trunk including a first physical link and a second physical link,
the first network device having a first port coupled through the first physical link to a first port of the second network device,
the first network device having a second port coupled through the second physical link to a second port of the second network device,
the first network device to transmit a first configuration message over the first and second physical links to the second network device,
the first configuration message to include a port identifier of the first port of the first network device and a path cost of the multi-link trunk,
the first network device to block a link in the data communications network to remove a loop in the data communications network.

15. The data communications network described in claim 14 wherein the second network device is to transmit a second configuration message over the first and second physical links to the first network device, the second configuration message to include a port identifier of the first port of the second network device.

16. The data communications network described in claim 15 wherein the path cost of the multi-link trunk is based upon a first bandwidth of the first physical link combined with a second bandwidth of the second physical link.

17. The data communications network described in claim 14 wherein the loop in the data communications network is removed in accordance with a spanning tree protocol.

18. The data communications network described in claim 17 wherein the spanning tree protocol is to block the first physical link to remove a loop in the data communications network only if the spanning tree protocol is to block simultaneously the second physical link.

19. The data communications network described in claim 14 wherein the second network device is to detect a misconfiguration condition if a received configuration message received over the first physical link does not include the port identifier of the first port of the first network device.

20. The data communications network described in claim 19 wherein the second network device is to place a logical link of a port of the second network device having a lowest port identifier in forwarding state if the misconfiguration condition is detected, the second network device to place a logical link of a port of the second network device not having the lowest port identifier in blocking state if the misconfiguration condition is detected.

21. A method of interconnecting a plurality of network devices in a data communications network including a first network device and a second network device, comprising:
coupling first and second ports of the first network device to first and second ports of the second network device over a multi-link trunk, the multi-ink trunk including multiple physical links, two or more of the physical links configured as a single logical link;
transmitting a first configuration message from each one of the first and second ports of the first network device to the first and second ports of the second network device, respectively;
receiving the first configuration message on the first and second ports of the second network device;
detecting any misconfiguration of the links between the first network device and the second network device based on the first configuration message: and
blocking any link in the network that forms a loop in the network.

22. The method of claim 21 wherein the multi-link trunk is formed by a first and a second physical links between the first and second network devices, the first and second physical links to form a logical link between the first and second network devices.

23. The method of claim 21 wherein the first configuration message further includes
a path cost of the logical link in the first configuration message.

24. The method of claim 23 wherein the path cost is based upon a first bandwidth of a first physical link combined with a second bandwidth of a second physical link, the first and second physical links being two physical links in the multi-link trunk.

25. A data communications network, comprising:
a plurality of network devices including a first network device and a second network device; and
a multi-link trunk coupling the first network device to the second network device,
the multi-link trunk including a first physical link and a second physical link,
the first network device having a first port coupled through the first physical link to a first port of the second network device,
the first network device having a second port coupled through the second physical link to a second port of the second network device,
the first network device to transmit a first configuration message over the first and second physical links to the second network device,
the second network device to detect any misconfiguration of the links between the first network device and the second network device based on the first configuration message, and the first network device to block a link in the data communications network to remove a loop in the data communications network.

26. The data communications network of claim 25 wherein
the first configuration message includes a port identifier of the first port of the first network device and a path cost of the multi-link trunk.

27. The data communications network of claim 26 wherein
the path cost is based upon a first bandwidth of a first physical link combined with a second bandwidth of a second physical link, the first and second physical links being two physical links in the multi-link trunk.

* * * * *